Aug. 15, 1961 H. J. SCHMICK 2,996,419
METHOD OF JOINING GLASS ARTICLES AND COMPOSITION THEREFOR
Filed Jan. 30, 1956 2 Sheets-Sheet 1
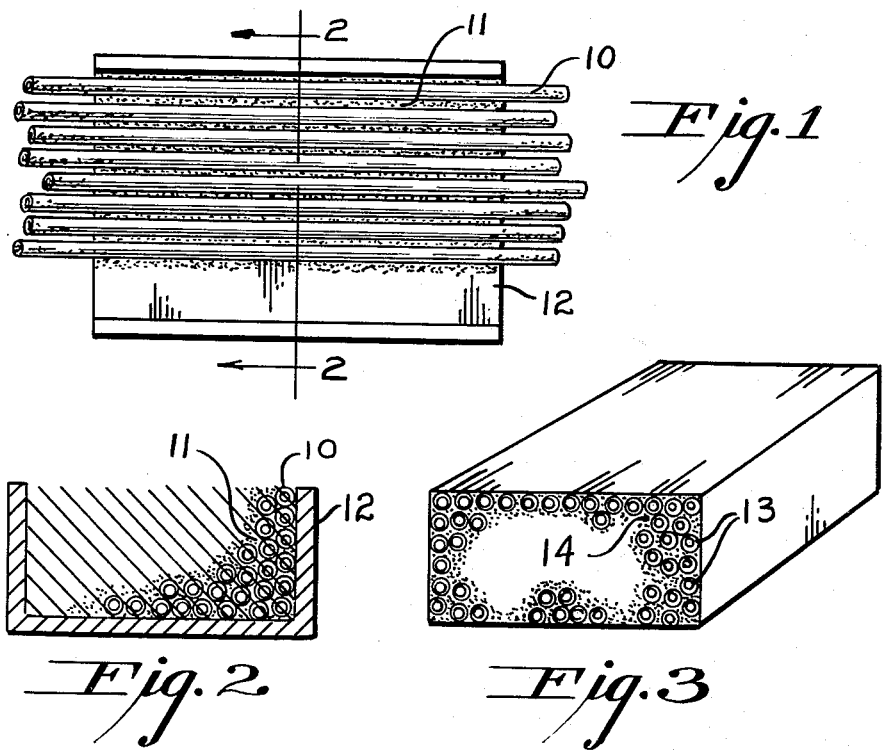
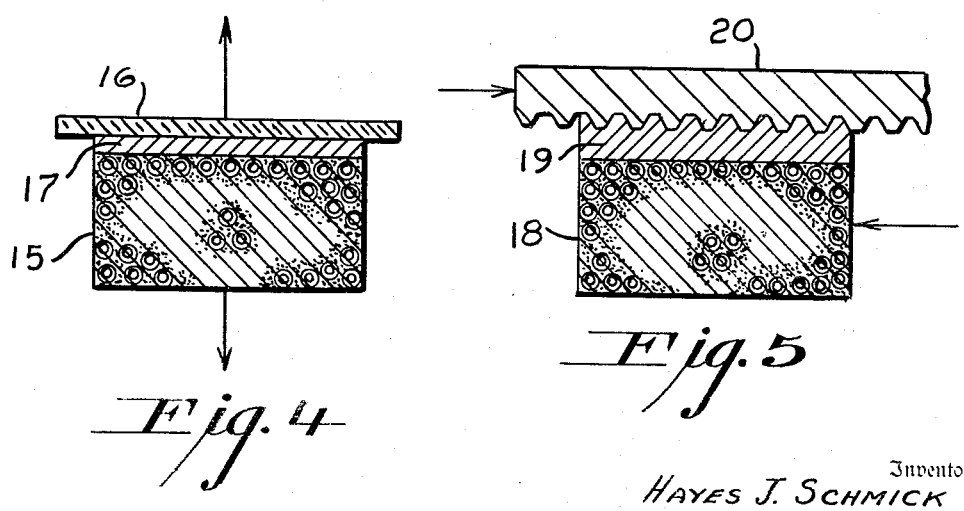
Inventor
HAYES J. SCHMICK
Attorney Aug. 15, 1961 H. J. SCHMICK 2,996,419
METHOD OF JOINING GLASS ARTICLES AND COMPOSITION THEREFOR
Filed Jan. 30, 1956 2 Sheets-Sheet 2
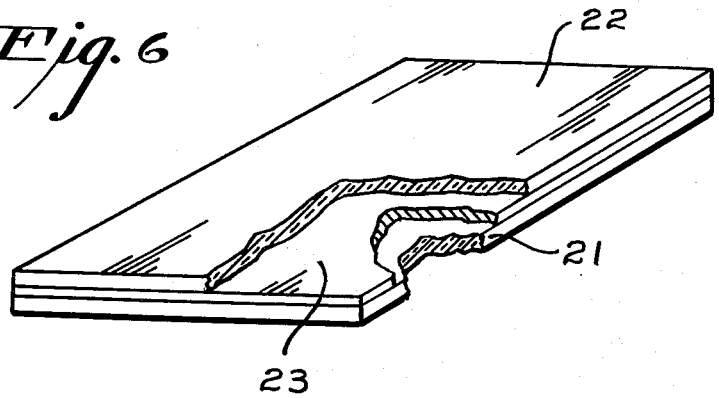
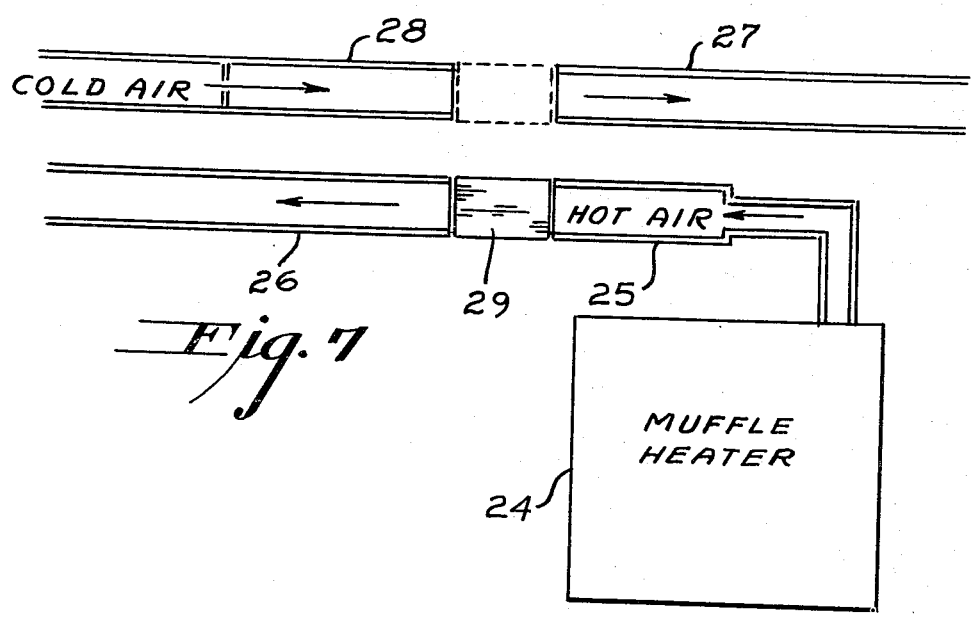
INVENTOR
HAYES J. SCHMICK
BY
ATTORNEY United States Patent Office 2,996,419
Patented Aug. 15, 1961

2,996,419
METHOD OF JOINING GLASS ARTICLES AND COMPOSITION THEREFOR
Hayes J. Schmick, Elmira, N.Y., assignor to Corning Glass Works, Corning, N.Y., a corporation of New York
Filed Jan. 30, 1956, Ser. No. 562,239
6 Claims. (Cl. 154—128)

This invention relates to the production of glass articles by joining or cementing glass bodies and/or pulverized glass by means of heat-cured compositions or cements which will withstand the stresses caused by differences in the thermal expansion coefficients of the cement and the glass bodies or powders joined thereby.

Heretofore, in making such joints it has been necessary to substantially match the thermal expansion coefficients of the glass and the sealing medium in order to prevent weakness or breakage of the joint otherwise occurring, due to stresses caused by differences in the thermal expansion coefficients of the joined materials. Such requirements have placed a limit on the variety and kind of joints which have in the past been possible. Any means to avoid the necessity for substantially matching the thermal expansion coefficients of the materials to be joined is greatly to be desired.

It is an object of this invention to provide heat-cured, heat-resistant compositions, which can be utilized as a cement to join articles or particles of glass, or as a molding compound to form molded articles.

Another object is to provide a method of making such compositions.

A further object is to provide a method of joining glass articles and/or particles.

Still another object is to provide a method of making molded heat-resistant articles.

To these and other ends the invention comprises interposing between glass bodies an intimate mixture consisting essentially of about 15% to about 90% by weight of at least one finely divided metal and about 85% to about 10% by weight of at least one non-distillable organo polysiloxane or silicone, and heating them up to at least about 500°–750° C. in air until the organo polysiloxane is completely decomposed. The carbonaceous matter is thereby substantially eliminated from the mixture.

Such mixtures adhere tenaciously to glass when cured by heat in contact therewith and are utilized in accordance with the invention to join glass bodies, such as glass tubes, or to join particles of pulverized glass for making molded articles thereof. The compositions and method of the invention are particularly adapted for the fabrication of glass articles which are to be subjected to severe thermal shock, such as heat exchanger units, which are composed of a multiplicity of glass tubes in close parallel relationship permanently joined without fusion, an accomplishment which has heretofore been impossible.

For a better understanding of the invention, reference is had to the accompanying drawing in which:

FIG. 1 is a plan view showing the mode of bonding a plurality of glass tubes 10 with a metal-silicone cement 11 in accordance with the invention, the glass tubes being supported by a steel form 12 but being exaggerated in size relative to the form for better illustration.

FIG. 2 is a section on the line 2—2 of FIG. 1.

FIG. 3 is a perspective view of a finished unit comprising a multiplicity of glass tubes 13, bonded with a metal-silicone cement 14, which is disposed between the tubes and around each tube in the manner illustrated in FIGS. 1 and 2.

FIG. 4 is a vertical section of a unit 15, similar to that shown in FIG. 3 having a plate of glass 16, bonded to its upper face by a layer of a metal-silicone cement 17.

FIG. 5 is a vertical section of a unit 18, similar to that shown in FIG. 3, having a molded rack-gear 19, composed of a mixture of powdered glass and metal-silicone cement in accordance with the invention, joined to its upper face by the metal-silicone, the rack-gear conforming in shape to a steel molding strip 20 in contact therewith.

FIG. 6 is a perspective view of a pair of glass plates 21 and 22, the latter of which is partly broken away to show a portion of a layer of a metal-silicone cement 23 uniting the two plates.

FIG. 7 is a diagrammatic plan view of a device for testing units similar to that shown in FIG. 3 for their resistance to thermal shock. The device comprises a source of heated compressed air 24, conduits 25 and 26 for the heated air, and conduits 27 and 28 for cold compressed air (source not shown). Conduits 25 and 26 are longitudinally spaced on a common axis and conduits 27 and 28 are longitudinally spaced on a common axis which is parallel to and spaced from the axis of conduits 25 and 26. The space between conduits 25 and 26 is directly opposite the space between conduits 27 and 28, each space being about 3″ long and having the same lateral cross-sectional dimensions.

A unit 29, composed of bonded glass tubes similar to the unit shown in FIG. 3 is disposed in the space between conduits 25 and 26 with the glass tubes in longitudinal relation to the axis of the conduits, the lateral cross-section of the unit being substantially the same as the lateral cross section of the space.

For the purpose of testing the thermal shock resistance of the unit 29, reciprocating means (not shown) is provided for moving the unit 29 laterally to and from the space between conduits 27 and 28 and the space between conduits 25 and 26.

The metal-silicone mixture is preferably prepared by mixing the finely divided metal with a commercial silicone solution. Organo polysiloxanes or silicones as marketed are ordinarily dissolved in a solvent, such as toluene or xylene, in the proportion of 50% by weight of solids. The viscosity of the metal-silicone mixture can be reduced, if desired, by the further addition of solvent. By appropriate adjustment of its viscosity, the metal-silicone mixture, according to the invention, may be utilized for joining glass bodies of practically any size and shape with a bond which is surprisingly heat-resistant and resilient at temperatures up to 600° C. and above. The metal-silicone mixture also is useful for uniting up to about 90% by weight of powdered glass for the production of molded articles thereof. More than about 90% of powdered glass, however, cannot be satisfactorily bonded.

The resiliency of the final composition may be varied by changing the proportion of metal and silicone, the resiliency being increased by an increase in the proportion of the metal. For example, an aluminum-silicone mixture containing about 70% of finely divided aluminum by weight exclusive of solvent, after being heated up to about 600° C. for 1 hour, is substantially resilient and becomes more so as the percentage of aluminum is further increased up to about 90%. Beyond this amount of aluminum the proportion of silicone is insufficient to produce a satisfactory bond. When heated at substantially higher temperatures or for substantially longer times, however, such compositions lose some of their resiliency through oxidation of the aluminum and, when heated at 1000° C. or above, they are practically non-resilient. Aluminum-silicone mixtures containing less than about 70% aluminum by weight exclusive of solvent are not sufficiently resilient when cured for cementing glass bodies having thermal expansion coefficients above about $30 \times 10^{-7}$ per ° C. but may be used in combination with pulverized glass of practically any expansion coefficient to form molded articles even when the aluminum content is only 15%.

Some metals, such as zinc, produce less resilient heat cured compositions than aluminum, and zinc, alone or in combination with another metal such as aluminum, can be utilized to obtain various degrees of resiliency at a specific firing temperature.

The resiliency of heat-cured metal-silicone cements having metal contents between 15% and 70%, as well as above 70%, however, can be substantially increased by being bloated or foamed during their heat treatments. Bloating is conveniently accomplished by a rapid evaporation of solvent during the curing step, for example, by the undelayed heating of the bonded article or the molded composition at a temperature, say 150° C., sufficient to evaporate the solvent rapidly. To avoid bloating of the composition, on the other hand, the bonded article or molded composition is heated several hours, say overnight, at about 100° C. in order to slowly evaporate the solvent and solidify the silicone before further heat treatment.

Bloating can also be accomplished by using one of the so-called "silicone foaming powders," which are dry and free of solvent and which contain a foaming agent. For intimate admixture they are preferably ground together with the finely divided metal in a ball mill or, since the melting point of the silicone is low, the finely divided metal can be stirred into the molten silicone.

The resiliency of a heat-cured metal-silicone cement can be substantially decreased, if desired, by including in the batch a suitable proportion of a less ductile metal, such for example as the addition of powdered zinc to an aluminum-silicone cement.

Commercial silicate glasses of practically any composition and thermal expansion characteristics can be bonded by the compositions and method of the invention and such successful bonding, despite the apparent incompatibilities of the glass and the bonding composition, is believed to be due to the unusual resilient character of the bond which compensates for any inconsistencies or differences in the thermal expansions and contractions of the glass and the bonding composition.

Silicone paints are known, which comprise finely divided aluminum dispersed in an organo polysiloxane or mixture of organo polysiloxanes and which dry or cure to hard, durable metal-silicone films capable of withstanding temperatures in the neighborhood of 400°–500° C. for limited times without substantial decomposition of the silicone. It was not heretofore known, however, as I have now discovered, that, when such aluminum silicone paints or, generally, when mixtures of finely divided metals dispersed in non-distillable organo polysiloxanes are heated at high enough temperatures for long enough times to decompose the organo polysiloxanes and eliminate the carbonaceous matter, the resulting products have unexpectedly desirable characteristics making them particularly suitable for glass-bonding cements and molding compositions. Such products are characterized by strong cohesion and adhesion to glass when formed in contact therewith and, surprisingly, will withstand elevated temperatures, in some instances as high as 1000° C. or higher, without substantial loss of cohesion. As is pointed out above, such compositions may be rendered highly resilient.

Apparently a reaction and/or combination occurs, when the metal-silicone mixtures are treated in accordance with the invention, because neither the finely divided metal nor the non-distillable organo polysiloxane, when individually so treated, possesses the cohesion and the surprising adhesion to glass which characterize the present compositions.

By non-distillable organo polysiloxane I mean, an organo polysiloxane, which on being heated does not substantially evaporate as such but which decomposes and leaves a residue of $SiO_2$. Such organo polysiloxanes are composed essentially of the recurring units,

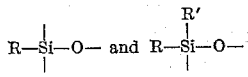

where R and R′ are the same or different organic radicals with carbon-silicon linkages and may include alkyl radicals such as methyl, ethyl, propyl, isopropyl, butyl, isobutyl, amyl, hexyl, heptyl to octadecyl and higher; alicyclic radicals such as cyclopentyl, cyclohexyl, etc.; aryl and alkaryl radicals such as phenyl, mono- and polyalkyl phenyls as tolyl, xylyl, mesityl, mono-, di- and triethyl phenyls, mono-, di- and tripropyl phenyls, etc.; naphthyl, mono- and tri-propyl naphthyl, etc.; tetra-hydro-naphthyl; anthracyl, etc.; aralkyl radicals such as benzyl, phenylethyl, etc.; alkenyl radicals such as methallyl, allyl, vinyl etc. I have found that organo polysiloxanes composed of units in which R and R′, are methyl, ethyl, and phenyl are particularly effective and desirable for the present purpose.

If desired, however, as I have found, the selected organo polysiloxane or polysiloxanes can be extended by addition thereto of up to 50% by weight on the dry basis of high organic polymers which are compatible with them, such as, urea-formaldehyde, acrylic esters, coumarone, ethyl cellulose, chlorinated diphenyls, ester gum, polymeric tung oil, polymeric linseed oil, styrenated alkyds, and polymeric vinyl butyrates, and also, in smaller amounts, those which are partially compatible, such as, oxidizing and non-oxidizing alkyd resins, melamine formaldehyde, nitrocellulose, vinyl chloride-acetate, and polystyrene.

While the batches of the glass bonding compositions of the invention consist essentially of a finely divided metal and a silicone, it will thus be apparent that they may also contain additives which dilute the silicone or the batch without substantial alteration of the fundamental character thereof. It is to be understood, therefore, that compositions defined by the term "consisting essentially" where it occurs herein may include such additives in addition to the "essential" components.

On the other hand, distillable organo polysiloxanes, such as the well known silicone oils, which distill without decomposition, are not effective in the new method and do not react with finely divided metals when mixed therewith and heated. It is believed that in this case, since the silicone is evaporated without decomposition, it cannot react with the finely divided metal. In this connection also it has been found that the presence of an oil, particularly a mineral oil, in the reaction mixture of the invention prevents the reaction or combination of the finely divided metal and the non-distillable organo polysiloxanes. Contamination of the mixture with such oils should, therefore, be avoided.

With certain obvious exceptions, all metals are effective for the purpose of the invention. Aluminum is particularly effective. Zinc, iron, copper and its alloys, titanium, tin, bismuth, magnesium, antimony, and silver are also quite effective. Best results are obtained when the finely divided metal is lamellar in form and, for this reason, ductile metals such as aluminum, copper, and the like, which can be pulverized in flake form in stamp mills, are more effective in the new process than crystalline or brittle metals, such as zinc, bismuth, antimony, and the like.

Metals which are obviously unsuitable for the purposes of the invention include the alkali metals, which are too reactive, the noble metals including gold and the metals of the platinum and palladium groups, which are not reactive with the organo polysiloxanes, the rare earth metals which are too rare and expensive, and also those metals which are poisonous or otherwise hazardous such as thallium and arsenic, and the radioactive metals. Mercury, of course, is too volatile for the present purposes and lead per se, surprisingly, does not produce a satisfactory result.

While the reason for the reaction or combination of a finely divided metal with a non-distillable organo polysiloxane according to the invention is not known, it is believed that the intimate association of the minute particles of metal with the organo polysiloxane when the carbon-silicon linkage is broken by thermal decomposition, plays an important part. The reaction or combination is further facilitated by decreasing the particle size of the finely divided metal and making the particles lamellar in form. It is further believed that the momentarily free or nascent siloxane units,

are particularly reactive at the instant of their formation by the thermal decomposition of the organo polysiloxane and that some combination of the metal and the siloxane is possible, even at temperatures below 1000° C. The difficulty of proving this by analysis, however, has thus far been insurmountable, since no analytical procedure is known for determining both $SiO_2$ and a metal silicate per se in the product.

The identification of such compounds in the final product by means of X-ray analysis also has not been successful. It is possible that such compounds, if formed, are amorphous in character and they could not in that case produce a distinctive pattern when subjected to the conventional X-ray analysis, which is effective only with crystalline materials.

*Example 1*

A mixture was made comprising 141 parts by weight of finely divided aluminum and 79 parts by weight of a silicone comprising a mixture of monophenyl-, di-methyl,- and phenylmethyl-polysiloxanes in equal proportions by weight dissolved in toluene in the proportion of 50% by weight of solids. Exclusive of solvent, the mixture consisted approximately of 78% metal and 22% silicone. The mixture was thinned to the consistency of paint with perchlorethylene.

A multiplicity of small glass tubes was bonded into a unit with such mixture, the tubes being about 5 to 6 inches long, 50 mils in diameter with a wall thickness of 2 mils and composed of a heat-resistant high-alumina-lime-silicate glass containing boric oxide but substantially free of alkali metal oxide, having a thermal expansion coefficient of $42 \times 10^{-7}$ per ° C. and a softening point of 915° C. The tubes were combined into a unitary mass by assembling them in a metal form 3 inches in length as shown in FIGS. 1 and 2, applying the aluminum-silicone mixture to the central portion of the tubes and working it between and around them while keeping them relatively close together with a minimum of the bonding material between them.

The form containing the mass of treated tubes was placed in a furnace at about 100° C. for 18 hours to evaporate the solvent and harden the silicone. The temperature was then raised to 150° C. and held for 1 hour after which the temperature was raised to 350° C. for 1 hour and then to 610° C. for 1 hour.

The finished assembly of glass tubes was cut to a uniform length of 3 inches as shown in FIG. 3 and its resistance to thermal shock was then tested in the device illustrated in FIG. 7 by substituting it for the unit 29. It was then repeatedly moved from the space between conduits 25 and 26 to the space between conduits 27 and 28 and back at intervals of a few seconds. While in the first position the heated compressed air at a temperature of about 500° C. traversed the glass tubes of the unit for 2 seconds raising them to red heat. It was then moved in 0.5 second into the other position where unheated air was blown through the glass tubes for 1 second cooling the glass tubes to an average of about 200° C.

After being thus heated and cooled many times no cracking of the glass tubes nor disintegration of the aluminum-silicone cement was detected.

*Example 2*

A unit of glass tubes identical in composition and structure with the unit described in Example 1 was prepared and a plate of low expansion sodium borosilicate glass, having a thermal expansion coefficient of $32 \times 10^{-7}$ per ° C. and a softening point of 815° C., was united with one face of the unit as is shown in FIG. 4. The glass plate was about ¼ inch thick and had an area somewhat larger than the face of the unit as is shown. The glass plate was joined to the unit as shown in FIG. 4 by means of a layer 17 of the aluminum-silicone mixture described in Example 1 and the joint was cured by heating the whole according to the schedule set forth in Example 1.

The cohesion or tensile strength of the joint was measured by exerting tension on the unit 15 and the glass plate 16 in the directions shown by the arrows in FIG. 4. A force of 35 pounds per square inch was required to rupture the joint 17.

*Example 3*

A mixture was made comprising 8 parts by weight of finely divided aluminum, 5 parts by weight of finely divided zinc, and 12 parts by weight of the silicone referred to in Example 1. Such composition was utilized as a cement for the purpose of making a molding composition with powdered glass. The mixture, accordingly, was incorporated with 91 parts by weight of finely pulverized glass composed of the low expansion sodium borosilicate glass referred to in Example 2. The resulting mixture was adjusted to putty-like consistency by addition of perchlorethylene. Exclusive of solvent the cement consisted of 68% by weight of aluminum and zinc and 32% by weight of silicone and the final composition comprised approximately 12% of metal, 5% of silicone and 83% of powdered glass.

A quantity of such mixture was molded as is shown in FIG 5 by means of the metal strip 20 to form a rack-gear 19 in contact with the upper fact of the unit of glass tubes 18. After being dried overnight at about 100° C. the unit and the molded rack-gear together with the metal strip were heated at 150° C. for 1 hour, then at 350° C. for 1 hour, and finally at 610° C. for 1 hour.

In order to test the coherence of the molded rack-gear 19 and its adherence to the unit 18, the shear resistance was measured in the conventional manner by applying compression to the unit 18 and to the metal strip 20 as is indicated by the arrows in FIG. 5. A shearing stress of 175 pounds per square inch was required to rupture the bond between the unit 18 and the rack-gear 19.

*Example 4*

A mixture of 130 parts by weight of finely divided aluminum and 79 parts by weight of the silicone referred to in Example 1 was incorporated with 12 parts by weight of the pulverized borosilicate glass referred to in Example 2. The mixture was thinned to brushable consistency by addition of perchlorethylene. Exclusive of solvent the composition consisted of 77% metal and 23% silicone.

The mixture was molded in tubular form by applying a coating thereof, 1/16 to 1/8 inch thick, on a tube of rolled up ashless paper about 1 inch in diameter. After drying over night at about 100° C. the molded tube was heated up to 175° C. where it was held for about 1 hour and the temperature was then raised to 350° C. for 1 hour and finally to 620° C. for 1 hour, thereby to eliminate all carbonaceous material.

A tough coherent tube remained which had a metallic ring when struck and which withstood repeated heating at successively higher temperatures up to 1000° C.

followed each time by quenching in cold water. No breakage nor loss of coherence was apparent following such test.

Example 5

A mixture was made of 38 parts by weight of powdered zinc and 19 parts by weight of a silicone consisting of a mixture of equal parts of dimethyl- and monophenyl-polysiloxanes dissolved in toluene in the proportion of 50% by weight of solids. Exclusive of solvent the composition consisted of 80% zinc and 20% silicone. In the manner described in Example 1, the zinc-silicone mixture was applied to a test unit comprising a multiplicity of glass tubes 30 mils in diameter composed of the low expansion borosilicate glass referred to in Example 2. The unit was dried at 100° C. over night and was then fired at 150° C. for 1 hour, 345° C. for 1 hour, 565° C. for 1 hour, and 760° C. for ½ hour.

The finished unit after being cut uniformly to 3 inches in length was tested successfully for thermal shock resistance in the device illustrated in FIG. 7 according to the procedure set forth in Example 1, without substantial cracking of the glass tubes or disintegration of the zinc-silicone cement.

Example 6

The aluminum-silicone mixture described in Example 1 was utilized in the preparation of a test unit according to the procedure described in Example 1, the tubes having an inside diameter of 65 mils and a wall thickness of 2 to 3 mils but being composed of a lead-alumina-borosilicate glass containing 32% PbO and having a thermal expansion coefficient of approximately $37 \times 10^{-7}$ per ° C. and a softening point of about 750° C.

The finished unit after being cut uniformly to 3 inches in length was tested successfully for thermal shock resistance in the device illustrated in FIG 7 according to the procedure described in Example 1, without substantial cracking of the glass tubes or disintegration of the aluminum-silicone cement.

Examples 7–18

In order to ascertain that a variety of metals are effective in preparing and utilizing the compositions of the invention, a series of compositions was prepared and tested in the following manner, employing the following metals: aluminum, zinc, copper, bronze, iron, titanium, tin, nickel, bismuth, magnesium, antimony and silver.

Two parts by weight of the metal in finely divided form were dispersed in 1 part by weight of the silicone referred to in Example 1. Exclusive of solvent the mixture consisted of 80% by weight of metal and 20% by weight of silicone. The mixture was thinned to the consistency of thick paint by the addition of toluene.

For the purpose of testing the cohesion, adhesion, and resiliency of each composition, a coating thereof was applied to 1 face of each of 4 plates composed of the low expansion borosilicate glass described in Example 2. The coated faces of the 4 glass plates were then brought together as shown in FIG. 6 in pairs and the two pairs of glass plates after evaporation of solvent were heated in a furnace up to about 610° in about 25 minutes after which the temperature was held at 610° C. for 1 hour. One of the two pairs of glass plates was then removed and cooled while the temperature of the furnace and of the remaining pair of glass plates was raised and held at 750° C. for 1 hour. Thereafter, the remaining pair of glass plates was removed and cooled. Each pair of glass plates was joined as shown in FIG 6, by the metal-silicone cement. The plates were found to be unbroken and uncracked and so firmly united by the cementing composition that the plates could not be separated without driving a wedge between them, which resulted in breaking of the glass.

This procedure was carried out with each of the above-mentioned metals and the same result was obtained in each case.

Example 19

Two parts by weight of finely divided aluminum were dispersed in one part of a modified or extended silicone consisting of 75% silicone and 25% of an alkyd resin dissolved in toluene in the proportion of 50% by weight of solids, the silicone consisting of equal parts by weight of monophenyl-, dimethyl-, and phenylmethyl-polysiloxane. Exclusive of solvent the mixture contained 80% aluminum, 15% silicone, and 5% alkyd resin.

The mixture was applied in a layer between two glass plates in the manner described in Examples 7–18 and the joined plates after evaporation of solvent, were heated up to 600° C. where they were held for 1 hour and then cooled. As in the previous examples the plates were unbroken and so firmly united by the cementing composition that they could not be separated without breaking the glass.

Example 20

A heat-exchanger or regenerator was constructed comprising units made of glass tubes composed of the glass referred to in Example 1, having ⅜ inch inside diameter and 18 mils wall thickness. The tubes were disposed in contact with and in parallel relation to each other in superposed layers, the long axis of each tube being directly above the long axis of a tube in the next lower layer.

While held in such position the tubes as a unit were immersed in the aluminum-silicone mixture described in Example 1, after which the tubes were drained for two minutes while air was blown through them to evaporate solvent and to aid in clearing interstices adjacent to each tube. After being heated at 150° C. for a half hour followed by heating at 400° C. for a half hour and then at 500° C. for a half hour, the tubes of each unit had become firmly joined.

When a regenerator composed of such units was installed as a part of a coal-burning steam boiler, the assembly of tubes was alternately heated and cooled by the alternate passage of exhaust gases at 260° C. and air at 27° C. After about 60 days the tubes and the bonding cement appeared to be substantially unaffected by the heat, the continual thermal change, and the acid fumes present in the combustion gases, and the condensate thereof.

Examples 21–24

So as to determine the minimum amount of aluminum which will form a satisfactory bond when mixed with a non-distillable organo polysiloxane and heat cured in contact with glass, powdered aluminum in various proportions was mixed with the silicone solution mentioned in Example 1 to form a series of compositions in which the percentage of aluminum was progressively diminished as follows exclusive of solvent:

|  | 1 | 2 | 3 | 4 |
|---|---|---|---|---|
| Aluminum_____percent__ | 40 | 25 | 15 |  |
| Silicone_____do____ | 60 | 75 | 85 |  |

Into the above compositions the pulverized glass referred to in Example 2 was incorporated in the following proportions based on the weight of the total mixture exclusive of solvent:

|  | 1 | 2 | 3 | 4 |
|---|---|---|---|---|
| Glass_____percent__ | 55 | 49 | 64 |  |

Such mixtures were molded into bars suitable for flexural strength tests which were dried overnight at 100° C. The bars were then cured by heating them first at 150° C. for 1 hour, then at 350° C. for 1 hour and finally 610° C. for ½ hour.

The transverse flexural strength of the bars was mea ured in the conventional manner by supporting them on spaced knife edges and loading them on a knife edge resting on their central portion equi-distant from the lower knife edges. The following strengths in pounds per square inch were obtained:

|  | 1 | 2 | 3 | 4 |
|---|---|---|---|---|
| Flexural Strength | 312 | 400 | 480 | 365 |

Since the composition containing 15% aluminum and 85% silicone possessed the maximum flexural strength and since the composition with a smaller proportion of aluminum possessed a markedly less flexural strength, it is apparent that the minimum amount of aluminum for a satisfactory bond is about 15%.

What is claimed is:

1. The method of joining together glass bodies which comprises interposing therebetween an intimate mixture consisting essentially of approximately 15% to 90% by weight of at least one finely divided metal selected from the group consisting of aluminum, zinc, iron, copper, copper alloys, titanium, tin, bismuth, magnesium, antimony, and silver and approximately 85% to 10% by weight of at least one non-distillable organo polysiloxane and heating them to at least about 500°–750° C. in air until the organo polysiloxane is completely decomposed.

2. The method joining together glass bodies which comprises making an intimate mixture consisting essentially of approximately 15% to 90% by weight of at least one finely divided metal selected from the group consisting of aluminum, zinc, iron, copper, copper alloys, titanium, tin, bismuth, magnesium, antimony, and silver and approximately 85% to 10% by weight of at least one non-distillable organo polysiloxane, combining such mixture with pulverized glass, the pulverized glass amounting to not over 90% by weight of the total, molding the combination and heating it up to at least about 500°–750° C. in air until the organo polysiloxane is completely decomposed.

3. The method of claim 2 in which the mixture of finely divided metal, organo polysiloxane and pulverized glass is molded in contact with a glass article before heating the mixture.

4. An article of manufacture comprising a plurality of glass bodies joined by the product resulting from the complete thermal decomposition of the organo polysiloxane component of a mixture consisting essentially of approximately 15% to 90% by weight of at least 1 finely divided metal selected from the group consisting of aluminum, zinc, iron, copper, copper alloys, titanium, tin, bismuth, magnesium, antimony, and silver and 85% to 10% by weight of at least 1 non-distallable organo polysiloxane.

5. The article of claim 4 in which the glass bodies are glass tubes and the proportion of finely divided metal is at least about 70% by weight.

6. The article of claim 4 in which the glass bodies are fine irregularly shaped particles of glass.

References Cited in the file of this patent

UNITED STATES PATENTS

| 2,027,931 | Ray | Jan. 14, 1936 |
| 2,329,632 | Marsden | Sept. 14, 1943 |
| 2,450,327 | Cogan et al. | Sept. 28, 1948 |
| 2,456,251 | Boughton et al. | Dec. 14, 1948 |
| 2,610,957 | Steinman et al. | Sept. 16, 1952 |
| 2,743,192 | White | Apr. 24, 1956 |
| 2,744,878 | Smith-Johannsen | May 8, 1956 |
| 2,768,993 | Drummond | Oct. 30, 1956 |
| 2,771,969 | Brownlow | Nov. 27, 1956 |
| 2,810,425 | Heyman | Oct. 22, 1957 |

FOREIGN PATENTS

| 646,024 | Great Britain | Nov. 15, 1950 |
| 1,032,187 | France | June 30, 1953 |
| 524,904 | Belgium | June 8, 1954 |